US008554750B2

(12) United States Patent  
Rangarajan et al.

(10) Patent No.: US 8,554,750 B2
(45) Date of Patent: Oct. 8, 2013

(54) NORMALIZATION ENGINE TO MANAGE CONFIGURATION MANAGEMENT DATABASE INTEGRITY

(75) Inventors: Govindarajan Rangarajan, Sunnyvale, CA (US); Darius Wallace, Sunnyvale, CA (US); Narayan Kumar, San Jose, CA (US); Douglas Mueller, Palo Alto, CA (US)

(73) Assignee: BMC Software, Inc., Houston, TX (US)

( * ) Notice: Subject to any disclaimer, the term of this patent is extended or adjusted under 35 U.S.C. 154(b) by 278 days.

(21) Appl. No.: 12/685,096

(22) Filed: Jan. 11, 2010

(65) Prior Publication Data

US 2010/0179945 A1 Jul. 15, 2010

Related U.S. Application Data (60) Provisional application No. 61/145,070, filed on Jan. 15, 2009.

(51) Int. Cl.
*G06F 17/00* (2006.01)
*G06F 7/00* (2006.01)

(52) U.S. Cl.
USPC ............ 707/694; 707/690; 707/769; 707/792

(58) Field of Classification Search
None
See application file for complete search history.

(56) References Cited

U.S. PATENT DOCUMENTS

| | | | | |
|---|---|---|---|---|
| 7,536,456 | B2 * | 5/2009 | Williams et al. | 709/224 |
| 7,624,422 | B2 * | 11/2009 | Williams et al. | 726/1 |
| 7,809,817 | B2 * | 10/2010 | Hillier | 709/223 |
| 7,853,675 | B2 * | 12/2010 | Cannon et al. | 709/222 |
| 2005/0257267 | A1 * | 11/2005 | Williams et al. | 726/25 |
| 2006/0136585 | A1 | 6/2006 | Mayfield et al. | |
| 2006/0143144 | A1 * | 6/2006 | Speeter et al. | 706/47 |
| 2008/0021917 | A1 * | 1/2008 | Baker et al. | 707/102 |
| 2008/0183724 | A1 | 7/2008 | Mueller | |
| 2008/0301081 | A1 * | 12/2008 | Karnik et al. | 706/48 |
| 2009/0144319 | A1 * | 6/2009 | Panwar et al. | 707/102 |

OTHER PUBLICATIONS

"BMC Atrium CMDB 7.5.00, User's Guide", 71 pgs, Jan. 2009.
"BMC Atrium CMDB 7.5.00 Patch 001, Normalization and Reconciliation Guide", 132 pgs, Mar. 2009.
"Configuration Management Database (CMDB) Federation Specification", Document No. DSP0252, Version: 1.0.0, 73 pgs, Jun. 22, 2009.

* cited by examiner

*Primary Examiner* — Jung Kim
*Assistant Examiner* — James J Wilcox (57) ABSTRACT

Data is often populated into Configuration Management Databases (CMDBs) from different sources. Because the data can come from a variety of sources, it may have inconsistencies—and may even be incomplete. A Normalization Engine (NE) may be able to automatically clean up the incoming data based on certain rules and knowledge. In one embodiment, the NE takes each Configuration Item (CI) or group of CIs that are to be normalized and applies a rule or a set of rules to see if the data may be cleaned up, and, if so, updates the CI or group of CIs accordingly. In particular, one embodiment may allow for the CI's data to be normalized by doing a look up against a Product Catalog and/or an Alias Catalog. In another embodiment, the NE architecture could be fully extensible, allowing for the creation of custom, rules-based plug-ins by users and/or third parties.

43 Claims, 9 Drawing Sheets

| STATUS | DESCRIPTION |
|---|---|
| NORMALIZATION NOT APPLICABLE | THE CI IS NOT NORMALIZED BUT DID NOT FAIL BECAUSE, FOR SOME CLASSES, NORMALIZATION IS NOT APPLICABLE.<br><br>THIS STATUS VALUE IS SET WHEN A CI IS CREATED OR MODIFIED. |
| NORMALIZATION FAILED | THE CI IS NOT NORMALIZED BECAUSE NO DATA CATALOG ENTRY IS FOUND FOR THE CI. |
| NORMALIZED AND APPROVED | THE CI IS NORMALIZED AND APPROVED BECAUSE THE FOLLOWING ITEMS ARE TRUE:<br>- THE CI MATCHED A UNIQUE ENTRY IN THE DATA CATALOG.<br>- THE MATCHING ENTRY IS AUTHORIZED IN THE ENVIRONMENT. |
| NORMALIZED NOT APPROVED | THE CI IS NORMALIZED BUT NOT APPROVED BECAUSE ONE OF THE FOLLOWING IS TRUE:<br>- THE CI MATCHED A CATALOG ENTRY THAT IS NOT AUTHORIZED<br>- THE CI DID NOT MATCH A CATALOG ENTRY AND THE NORMALIZATION ENGINE CREATED A NEW ENTRY FOR IT |
| MODIFIED AFTER LAST NORMALIZATION | THE CI HAS BEEN NORMALIZED, BUT AT LEAST ONE ATTRIBUTE THAT CAN BE NORMALIZED HAS BEEN MODIFIED.<br><br>IF USING INLINE NORMALIZATION, YOU MAY NOT SEE THIS STATUS FOR A CI. THIS STATUS APPEARS IN THE CASES OF CONTINUOUS AND BATCH NORMALIZATION. |

* DASHED LINES INDICATE OPTIONAL PATH

NORMALIZATION ENGINE TO MANAGE CONFIGURATION MANAGEMENT DATABASE INTEGRITY

CROSS-REFERENCE TO RELATED APPLICATIONS

This application claims priority to the U.S. Provisional Patent Application Ser. No. 61/145,070, entitled "A Normalization Engine to Manage Configuration Management Database (CMDB) Integrity," filed on Jan. 15, 2009, which is hereby incorporated by reference in its entirety.

BACKGROUND

This disclosure relates generally to the field of ITIL®-based (Information Technology Infrastructure Library) Configuration Management Databases (CMDBs). (ITIL is a registered trademark of The Lords Commissioners of Her Majesty's Treasury acting through The Office of Government Commerce and Central Computer and Telecommunications Agency, United Kingdom.) ITIL-based CMDBs are emerging as a prominent technology for Enterprise Management Software.

The usefulness of these CMDBs is dependent on the quality, reliability, and security of the data stored in them. A CMDB often contains data about managed resources known as Configuration Items (CIs) or configuration objects. In general, CIs correspond to real-world elements, components, or objects. ITIL version 3 defines a CI as: "Any Component that needs to be managed in order to deliver an IT Service. Information about each CI is recorded in a Configuration Record within the Configuration Management System and is maintained throughout its Lifecycle by Configuration Management. CIs are under the control of Change Management [systems]. CIs typically include IT Services, hardware, software, buildings, people, and formal documentation such as Process documentation and [Service Level Agreements]."

The CMDB serves as a point of integration between various IT management processes. Today, data is populated into the CMDB from different sources, such as spreadsheets, management tools, databases—and even manually. Such data, as it may come from a variety of sources, may have inconsistencies, and, in fact, could even be incomplete. These inconsistencies may result in at least the following problems in the CMDB: 1.) poor data quality; 2.) poor data manageability; 3.) poor data consistency; and 4.) the inability to "reconcile" CI's properly, resulting in duplicate CIs being stored in the CMDB. The process of "reconciliation" is described more fully in the document entitled, "BMC Atrium CMDB 7.5.00 Patch 001: Normalization and Reconciliation Guide," which is hereby incorporated by reference in its entirety, as well as U.S. patent application Ser. No. 11/204,189, entitled, "Resource Reconciliation," filed on Aug. 15, 2005 and U.S. patent application Ser. No. 11/669,005, entitled, "Configuration Management Database Reference Instance," filed on Jan. 30, 2007, which applications are also hereby incorporated by reference in their entireties.

What is needed to solve the aforementioned problems is a process for ensuring that the representation of entities, e.g., CIs, is consistent across the enterprise environment, regardless of the CI's data provider. This process is referred to herein as "normalization." A Normalization Engine (NE) may be able to "normalize" data based on certain rules and knowledge in any of the following ways: "cleaning up" the attribute values of an incoming CI based on preferred values or rule(s); cleaning up an entire collection of CIs at one time based on a preferred configuration or rule(s); or cleaning up one or more relationship CIs based on a preferred configuration or rule(s). Essentially, any attribute or characteristic relating to an entity or collection of entities may be compared to corresponding preferred value(s), configuration(s), or rule(s), and the appropriate remedial action taken, e.g., any inconsistencies found may either be logged in a report, output in the form of a warning, or the CI(s) may be updated accordingly to remove the inconsistencies. This will result in data that is more manageable, more consistent, of a higher quality, and that is able to be reconciled more effectively, along with other benefits that will become clear in light of the teachings of this disclosure.

SUMMARY

This disclosure relates to a field of CMDB data management referred to herein as "normalization." As mentioned above, when multiple sources provide data to a CMDB, data consistency problems such as the following can occur: 1.) poor quality data, e.g., inconsistent representations of CIs or collections of CIs; and 2.) the creation of duplicate CIs after an attempted reconciliation process. As part of an improved CMDB, and according to one aspect of the present invention, a Normalization Engine provides a centralized, customizable, and uniform way to overcome data quality and consistency problems.

In one embodiment, the NE may normalize, for example, the following attributes for hardware and software products: name; product categorization attributes, e.g., category, type, and item (CTI); manufacturer name; model; version number; patch; access control information, or other attributes, as may be defined for each class of CI. For example, one data provider may discover a copy of MICROSOFT® WINDOWS® Word software with a "Name" attribute of "MICROSOFT® Word 97," whereas another provider may find the same software with a "Name" attribute of "MICROSOFT® WINDOWS® Word." (MICROSOFT and WINDOWS are registered trademarks of the Microsoft group of companies.) An effective normalization of the "Name" attribute may be to change the "Name" attribute to "MICROSOFT® Word" for each discovered copy of the software, resulting in no data inconsistencies or unwanted duplication after an attempted reconciliation process.

In another embodiment, the NE may normalize an entire collection of CIs at one time based on a preferred configuration or rule(s). For example, a single server may be represented by a collection of several CIs (e.g., hardware CIs, software CIs, operating system CIs, central processing unit CIs, etc.), and the NE may want to ensure that each time such a server configuration is encountered, each of the related CIs are modeled and represented in a consistent and/or preferred fashion.

In yet another embodiment, the NE may normalize one or more relationship CIs based on a preferred configuration or rule(s). For instance, in the multi-CI server example discussed above, the NE may normalize each of the relationships relating the multiple CIs that make up the server to ensure that they match a predetermined and/or preferred configuration for that particular type of server, thus ensuring the related CIs are connected in the same way for each instance of the server stored in the CMDB.

With a Normalization Engine according to one aspect, a user can specify precisely what data is to be normalized, for example: a specific subset of the overall data; specific collections of related CIs and their attendant relationships; a specific class of CI; or the particular attributes for a specific class of CI. Additionally, data may be normalized either before or after it is written to a data repository in the CMDB.

In particular, one embodiment may allow for the CI's data to be normalized by doing a lookup against two or more data stores, e.g., a first data store that has information about various hardware and software products in a customer environment (e.g., product name, manufacturer name, version number, patch number, type, or item) and a second data store that has information about aliases for product names and manufacturer names. The "data store" may comprise storage of any format such as, for example, a database, a flat file, a hierarchically organized file (e.g., an XML file), and the like.

In another embodiment, the NE could allow for rules-based plug-ins, thus making the architecture of the NE extensible. For example, certain plug-ins could allow for the creation of new rules to: clean up other attributes in a CI (e.g., changing hostname or domain name attributes from lower to upper case); clean up collections of CIs in a particular manner; or clean up relationship instances that describe how to associate CIs of certain classes with each other. The extensibility could be offered through the provision of a Software Development Kit (SDK) or a suitable user interface (UI) that could allow users to specify and implement a virtually limitless set of new rules to normalize data in their enterprise environment as desired.

Normalizing data may allow different providers with various maturity levels to populate CIs with different information in their own provider data repositories—but still allow the CMDB to have the ability to clean up the CI instances from across the various data repositories into a single, unified resource data repository. This approach aims to ensure data integrity and compatibility with existing and future data providers and consumers by providing the ability to normalize data before, during, or after it is entered into the CMDB.

In one embodiment, a computer system comprising a programmable control device can be programmed to perform a data normalization method, the method comprising: selecting one or more CIs to be normalized; selecting one or more normalization rules from one or more knowledge bases; applying the one or more selected normalization rules to determine if there are any inconsistencies between the one or more selected CIs and the one or more selected normalization rules; and, for at least one of the one or more selected CIs wherein there is an inconsistency between the one or more selected CIs and the one or more selected normalization rules, taking an appropriate remedial action.

In another embodiment, the instructions for carrying out the above described method are tangibly embodied on a computer useable memory medium.

In still another embodiment, a computer network is utilized to carry out the above described method.

In yet another embodiment, a computer system comprising a programmable control device can be programmed to perform a data normalization method, the method comprising: defining selection criteria for the data normalization method, wherein the defined selection criteria comprises: the selection of one or more classes of Configuration Item (CI); and the selection of one or more attributes from each of the one or more selected classes of CI; selecting one or more CIs that meet the defined selection criteria; and, for at least one of the one or more selected CIs that meet the defined selection criteria: comparing a value for at least one of the one or more selected attributes to a corresponding specified attribute value stored in a first data store; and replacing the value of each compared attribute with the corresponding specified attribute value if the value of the compared attribute does not equal the corresponding specified attribute value.

DETAILED DESCRIPTION

Enhanced techniques to normalize CMDB data relating to various computational resources (e.g., hardware, software, and services) from a number of different sources are described herein. A method to normalize data for a CMDB may include: (1) selecting data to be normalized (or configuring system-wide normalization guidelines); (2) specifying whether the data should be normalized in "inline," i.e., real time, "continuous," or "batch" mode; (3) defining what classes, attributes, entities, or collections of entities to normalize; and (4) adding a normalization job and defining when it should be run. The various modes that normalization jobs may run in are presented below in connection with FIG. 2.

Illustrative CIs whose data and attributes may be normalized include, but are not limited to, computer systems, components of computer systems, data storage systems, switches, routers, memory, software applications (both installed products and running applications), operating systems and business services (e.g., order entry or change management and tracking services). The following embodiments, described in terms of a change configuration management system, e.g., a CMDB, are illustrative only and are not to be considered limiting in any respect.

Figure 1:
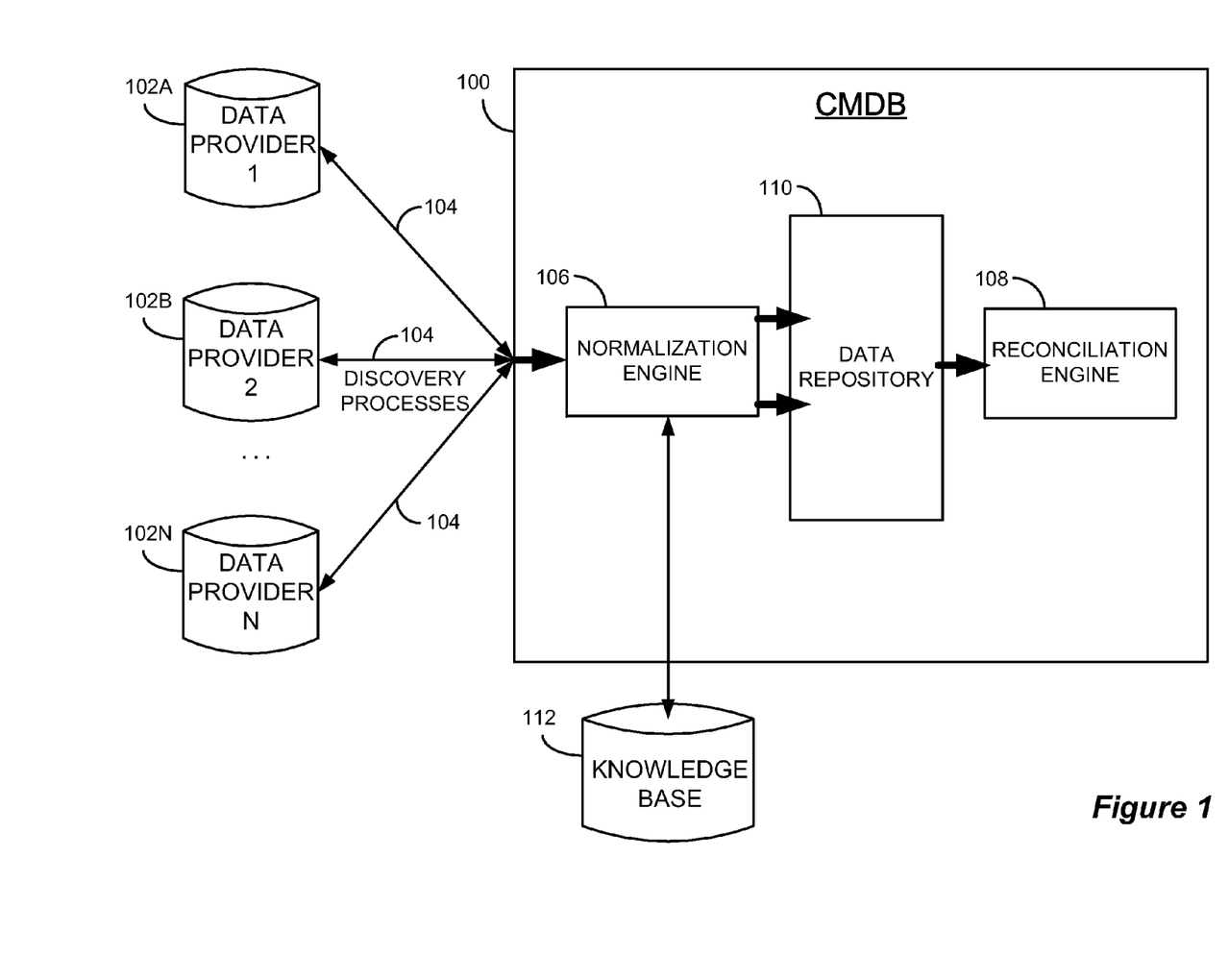
FIG. 1 shows, in block diagram form, an exemplary CMDB, an exemplary Normalization Engine, and related components, in accordance with one embodiment of the present invention.

FIG. 1 illustrates, in block diagram form, an exemplary CMDB 100, an exemplary Normalization Engine 106, and related components, in accordance with one embodiment. The CMDB 100 may potentially be populated with configuration items by various different discovery processes 104. As different discovery processes 104 may encounter the same object, it may be important to identify such situations, and then reconcile the information provided by the different processes for each object to avoid the potential of creating duplicate objects and/or the storage of low-quality data in the CMDB.

The discovered data may be sent to the CMDB 100, wherein Normalization engine 106 may attempt to normalize various attributes of various classes of the incoming data, various configurations of CI collections, or various relationships between CIs through the aid of one or more Knowledge Bases 112. A Knowledge Base 112, as used herein, is a generic term to represent any repository of information that may contain predetermined and/or preferred attribute values, configurations, or rules. Knowledge Base 112 may comprise any of a number of data stores, for example: a Product Catalog, an Alias Catalog, a Rules Catalog, a Relationship Catalog, or any other source of predetermined and/or preferred configuration information.

In one particular embodiment, the Knowledge Base 112 utilized by NE 106 may comprise a Product Catalog and/or an Alias Catalog, which may contain information about various products (both hardware and software) in a customer environment. One of the purposes of the Product Catalog may be to define how instances are preferably represented in the CMDB 100. After being normalized and stored in a data repository 110, the data may optionally be passed to reconciliation engine 108, which can initiate a reconciliation process according to specified reconciliation properties and parameters, thereby attempting to identify and merge instances of CIs in data repository 110 within the CMDB 100 that refer to the same "real world" objects. A goal of some reconciliation processes will be to end up with data repositories that are free from duplicated CIs.

When the NE 106 searches the Product Catalog for information regarding the relevant CI, it may result in one of three potential outcomes: the Product Catalog may return a single match, in which case the corresponding, i.e., matching, specified attribute value is applied to the appropriate attribute of the CI; the Product Catalog may return multiple matches, in which case the NE 106 may reject the CI and report an error; or the Product Catalog may return no matches, in which case, depending on the source of the data, the NE 106 may accept the CI and assign it an appropriate normalization status, as will be discussed below.

Figure 2:
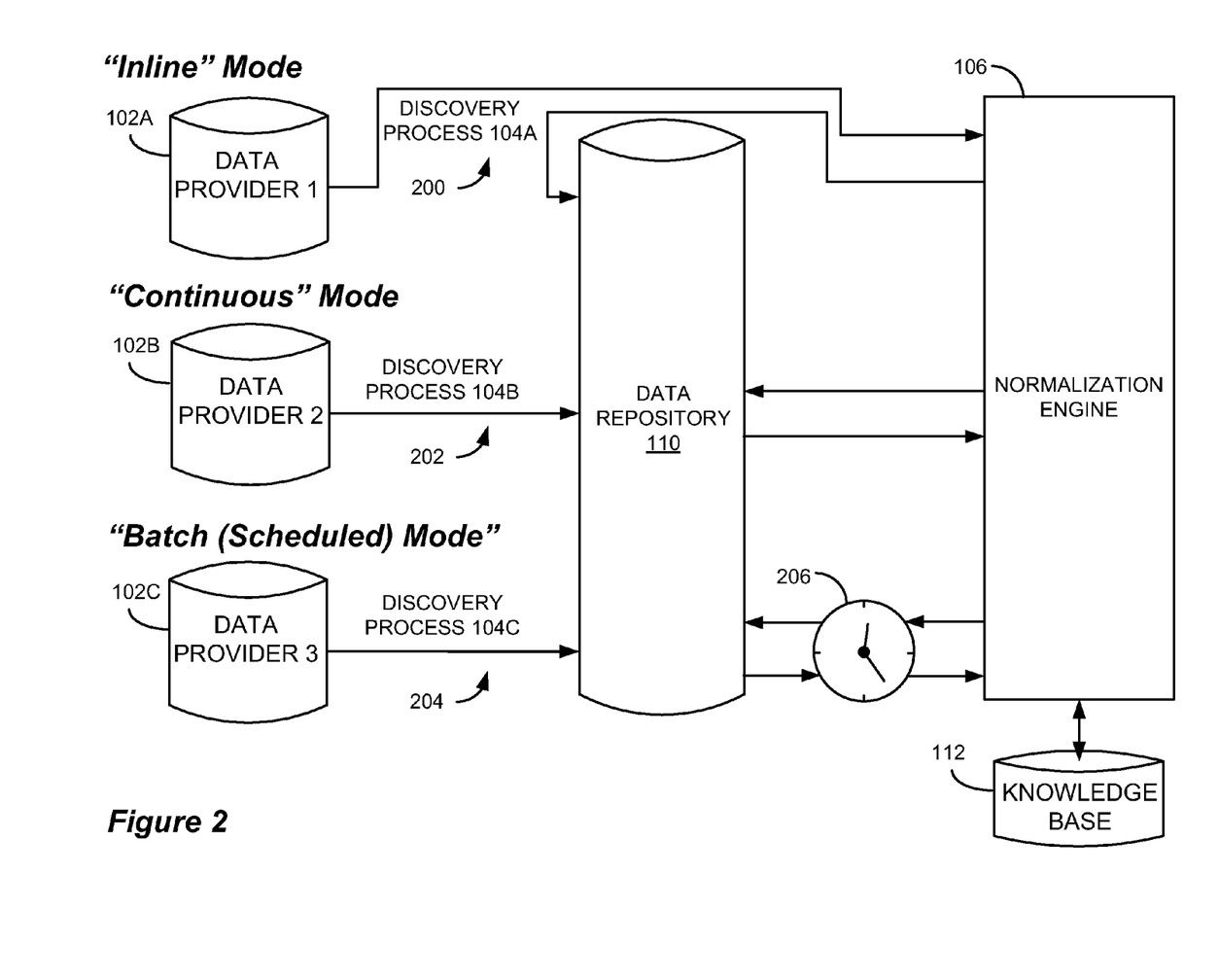
FIG. 2 shows "Inline," "Continuous," and "Batch" modes of normalization.

FIG. 2 illustrates various "modes" of normalization, including: "Inline" 200, "Continuous" 202, and "Batch" 204 modes, which modes will now be discussed in further detail. With regard to "Inline" (or "real time") mode 200, CIs are normalized by NE 106 any time that they are created or modified in the CMDB 100 (not shown in FIG. 2). In this mode, CIs are normalized before they are saved in a data repository, e.g., Data Repository 110, of the CMDB 100. If a CI cannot be normalized, it may be rejected, i.e., not saved in the CMDB 100, or saved but flagged with a normalization status of "not normalized," so that it could potentially be reviewed further later. With regard to "Continuous" mode 202, CIs are normalized by NE 106 after they are saved in a data repository of CMDB 100. When CIs are added or changed in Continuous mode, CMDB 100 notifies the Normalization Engine 106, which then checks and normalizes the modified CIs appropriately. In Continuous mode, normalization may be configured, for example, to begin either when a specified number of creation and modification events occur or after a specified interval of time. With regard to "Batch" or "Scheduled" mode 204, CIs are normalized by NE 106 after they are saved in a data repository, e.g., Data Repository 110, of CMDB 100 based on a particularly defined schedule 206. This is unlike the Continuous mode, which is based on changes to individual CIs.

Figure 3:
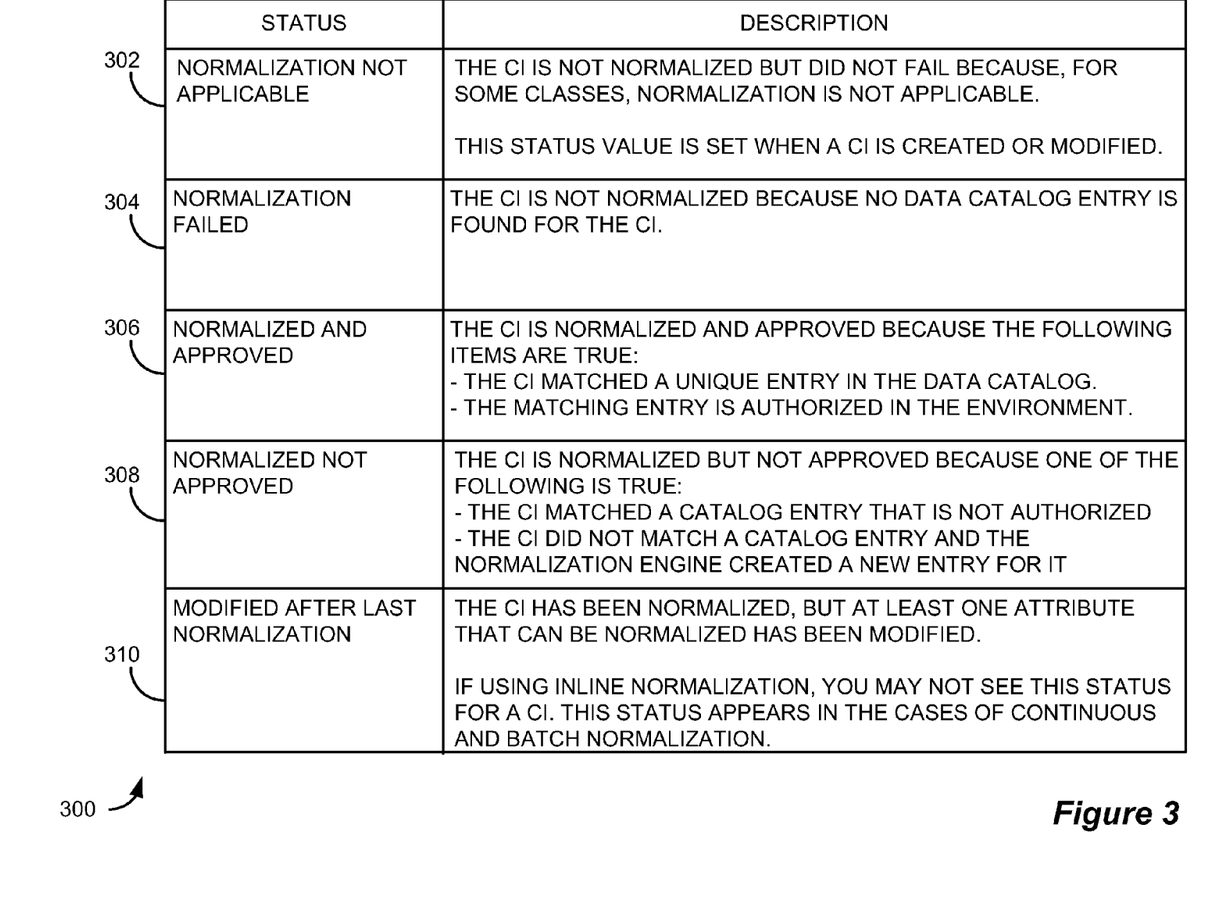
FIG. 3 shows a table of various normalization statuses and their attendant descriptions.

FIG. 3 shows a table 300 of various illustrative normalization statuses and their attendant descriptions. In one embodiment, each CI has a Normalization Status attribute to track the CI's stages of normalization. Status "Normalization Not Applicable" 302 is for situations in which, e.g., the CI is not normalized but did not fail because, for the CI's particular classes, normalization is not applicable or possible. Status "Normalization Failed" 304 is for situations in which, e.g., the CI is not normalized because no Knowledge Base 112 entry is found for the CI. Status "Normalized and Approved" 306 is for situations in which, e.g., the CI is normalized and approved because the CI matched a unique entry in the Knowledge Base 112 and the matching entry is approved, i.e., authorized or allowed to be in the enterprise environment. The "approved" attribute may be provided because some enterprises may want the ability to detect unauthorized products being used in their enterprise environment. Status "Normalized Not Approved" 308 is for situations in which, e.g., the CI is normalized but not approved because either the CI matched a unique entry in the Knowledge Base 112 but the matching entry is not approved or the CI did not match a Knowledge Base 112 entry and the Normalization Engine 106 created a new entry for it. If a new entry is created in this manner, its "approved" attribute may be set to "FALSE," "NO," or some other comparable value by default. Status "Modified After Last Normalization" 310 is for situations in which, e.g., the CI has been normalized but at least one attribute that can be normalized has been modified. With "Inline" normalization, a CI may not have this status. Typically, the normalization process may work in the following ways: by normalizing all CIs that have a status of not normalized; or by incrementally normalizing CIs that have been modified after normalization or after a normalization job is interrupted and has resumed. The NE may also optionally be instructed to re-normalize an entire data partition, if there is a need to do so.

Figure 4:
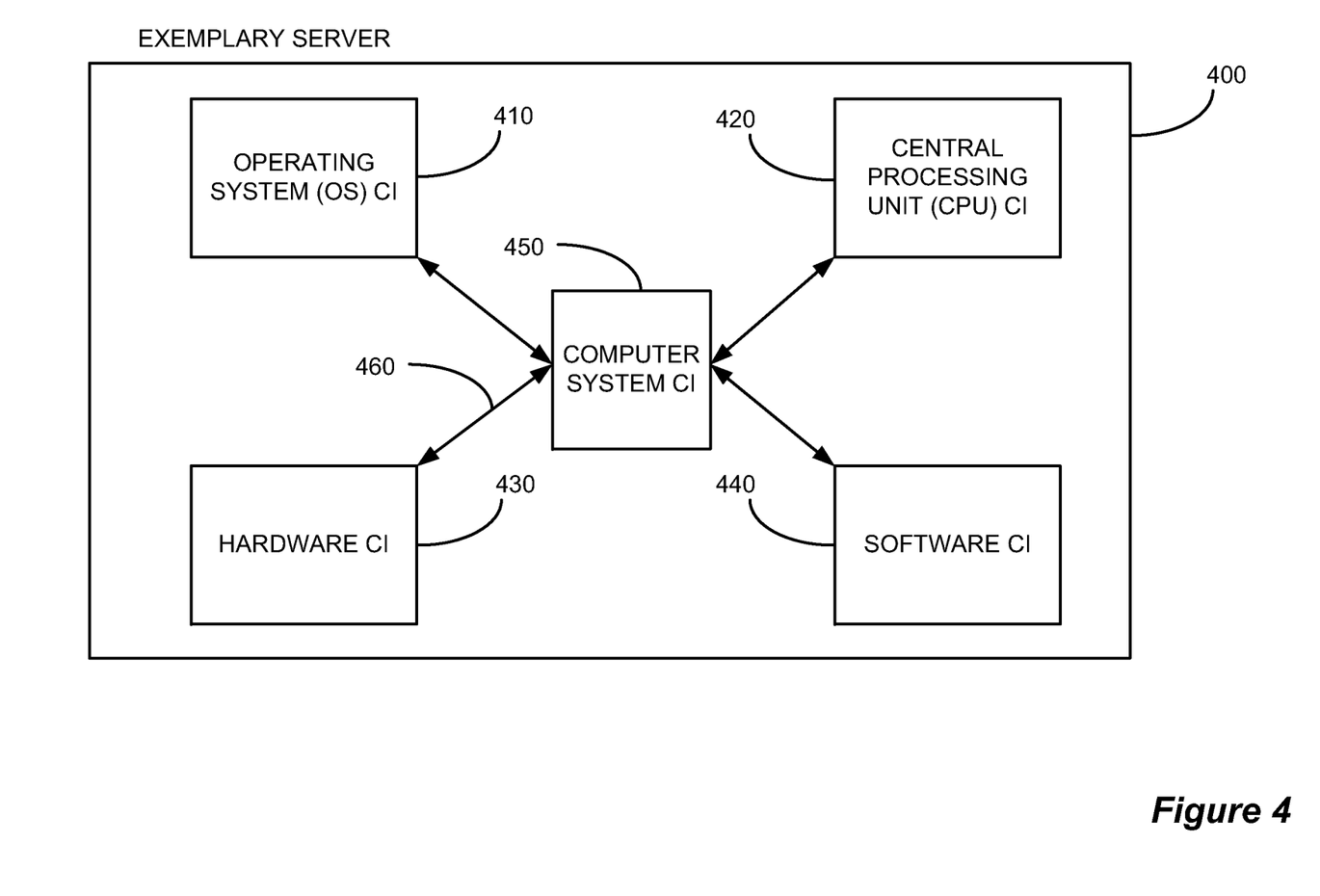
FIG. 4 shows, in block diagram form, an exemplary server composed of multiple, related CIs.

In practice, complex real-world objects may commonly be modeled in CMDBs as sets of many related CIs such that the various aspects of the real-world object may be independently monitored and/or configured as desired. FIG. 4 illustrates, in block diagram form, an exemplary server 400 that is comprised of multiple, related CIs. Potential CIs in this "exemplary server" include: an operating system (OS) CI 410, a CPU CI 420, as well as hardware CI 430 and software CI 440 that may represent any of a multitude of hardware and software entities comprising the server that needs configuration management. Each of the CIs comprising a complex, real-world object may be connected via a relationship CI 460 (represented by bi-directional arrows in FIG. 4) to one or more "anchor CIs" (represented by Computer System CI 450 in FIG. 4). While an anchor CI 450 is not necessary for an object represented by multiple CIs, such an arrangement may be a convenient way to group the related CIs together. Relationship CIs 460 may specify various attributes and/or configuration information about how any two or more given CIs are related to each other. Just as aspects of an individual CI or a collection of CIs may be normalized by NE 106, the relationship CIs 460 themselves may also be normalized according to a predetermined and/or preferred configuration. For example, a given normalization process may check against the relevant Knowledge Base(s) to ensure that each instance of the exemplary server 400 is made up of the correct set of CIs and that they are connected in the correct way by the appropriate relationship CIs 460. If an inconsistency or anomaly is found in a given server instance, the appropriate remedial action may then be taken, e.g., the NE may either remove the inconsistency, or it may be logged as an error or warning, as will be explained further below.

Figure 5A:
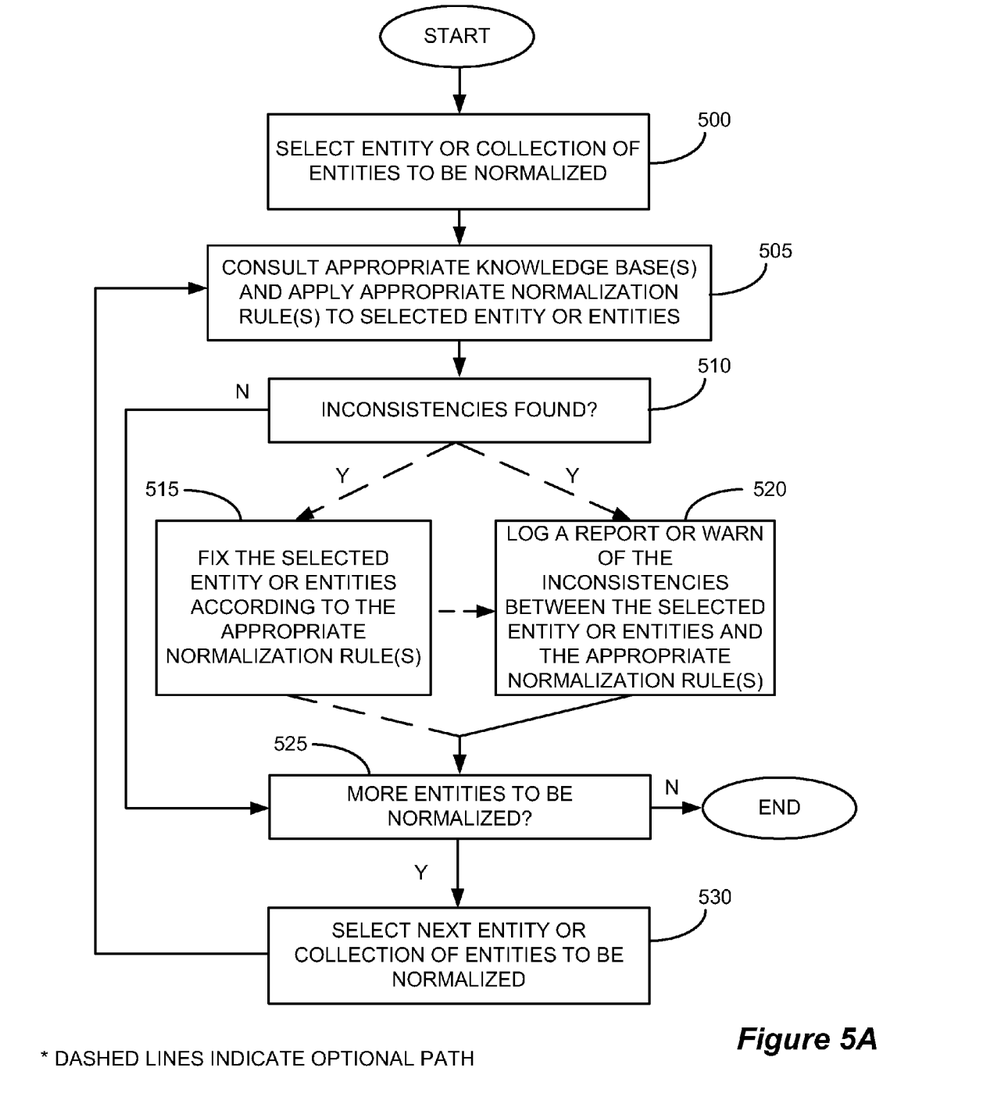
FIG. 5A shows, in flowchart form, an exemplary normalization process.

FIG. 5A shows, in flowchart form, a generalized, exemplary normalization process. First, the normalization process may select the current entity or collection of entities to be normalized (Step 500). The process may then consult the appropriate Knowledge Base(s) and find the appropriate normalization rule(s) to apply to the selected entity or collection of entities in order to clean up, or normalize, the data as appropriate (Step 505). If inconsistencies are found between the selected entity or collection of entities and appropriate rule(s) in the Knowledge Base(s) (Step 510), appropriate remedial action may be undertaken in one of two basic ways. Either the process may fix the selected entity or collection of entities according to the appropriate normalization rule and update normalization statuses accordingly (Step 515) and optionally make a log entry into a report file or raise a suitable warning of the inconsistencies (Step 520), or the process may solely make a log entry into a report file or raise a suitable warning of the inconsistencies (thus skipping step 515) (Step 520). The report file may be configured such that a system process, user, or administrator may later take the appropriate corrective measures, if so desired. Once the inconsistencies are appropriately dealt with, or if no inconsistencies were found for the current entity or collection of entities (Step 510), the process may then check to see if there are remaining entities to be normalized (Step 525). If there are remaining entities to normalize, it will repeat the process by selecting the next entity or collection of entities to be normalized (Step 530) and return to Step 505. If there are no further entities to normalize, the process may end.

Figure 5B:
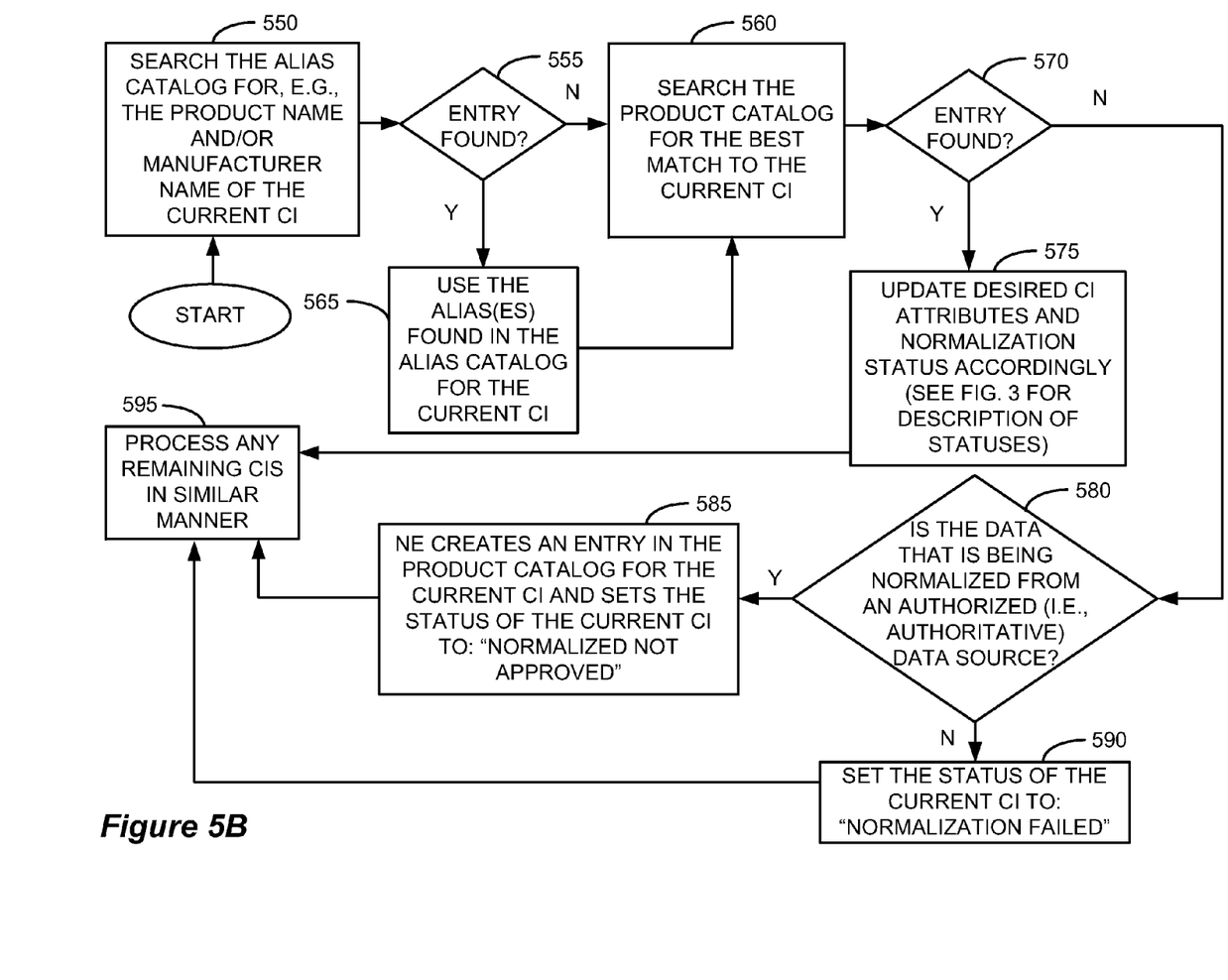
FIG. 5B shows, in flowchart form, a specific normalization process as applied to a Product Catalog and Alias Catalog.

FIG. 5B shows, in flowchart form, one embodiment of a specific normalization process involving a Product Catalog and an Alias Catalog. It should be noted that the Product/Alias example described with reference to FIG. 5B is but a single usage of a Normalization Engine given for explanatory purposes only, and should not be taken as a limiting example in any way. First, the process shown in FIG. 5B can read in the "Name" attribute of the CI that it is attempting to normalize, e.g., the product name or manufacturer name, and attempt to replace it with a preferred value from the Alias Catalog (Step 550). If an entry is found in Alias Catalog (Step 555), the preferred value for the particular entry will replace the current CI "Name" attribute value (Step 565). If an entry is not found in Alias Catalog (Step 555), the current CI "Name" attribute value will not be changed. Next, the process can search for a matching entry in the Product Catalog (Step 560). If an entry is found (Step 570), the process can then normalize the desired attributes by updating them appropriately, i.e., by replacing them with the corresponding specified attribute values in the product catalog and setting the CI's normalization status attribute accordingly (Step 575) before moving on to process the next CI (Step 595). If an entry is not found (Step 570), the process can check to see whether the data being normalized is from an authorized data source, that is, whether it is an authoritative or "trusted" source of data (Step 580). If the data being normalized is not authorized, the process can set the status of the current CI to "Normalization Failed" (Step 590) and then move on to process the next CI (Step 595). If instead, the data being normalized is from an authorized source, the NE 106 can create a new entry in the Product Catalog for the current CI and set its normalization status attribute to "Normalized Not Approved" (Step 585) and then move on to process the next CI (Step 595).

Figure 6:
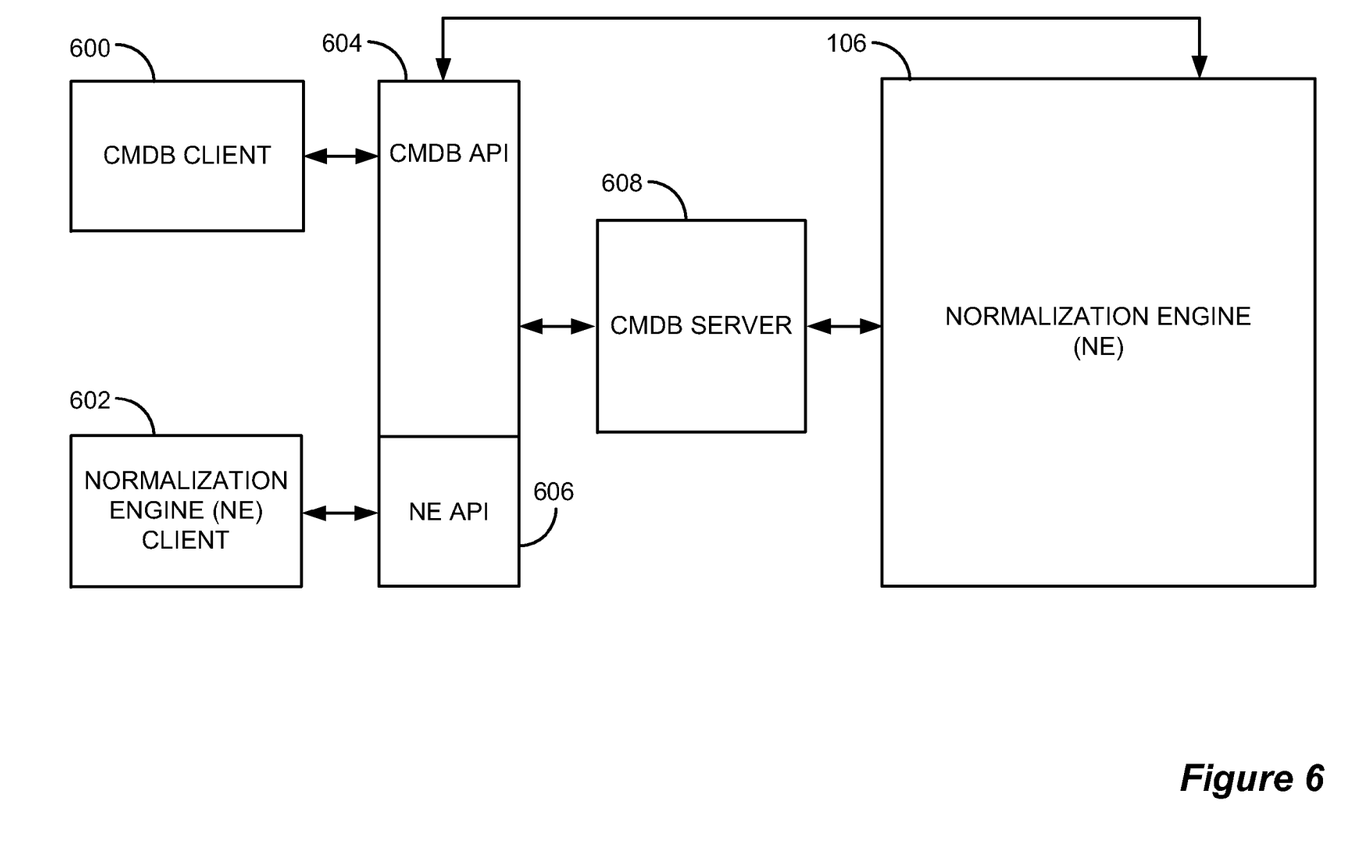
FIG. 6 shows, in block diagram form, an exemplary CMDB server, an exemplary Normalization Engine, and related APIs, in accordance with one embodiment of the present invention.

FIG. 6 shows, in block diagram form, an exemplary CMDB server 608, an exemplary Normalization Engine 106, and related APIs, in accordance with one embodiment. In this Normalization Engine infrastructure design, the Normalization Engine 106 is essentially a plug-in to the CMDB server 608. The Normalization Engine 106 will interface with the CMDB's native API 604 and the Normalization Engine API 606. A CMDB Client application 600 may allow a user or computer process to interface with and view the contents of the CMDB. A normalization engine client 602 may allow a user or computer process to, for example: check on normalization job statuses; define normalization system-wide settings; selectively define data for normalization; start normalization jobs manually; and even define their own logic and rules for normalization. For example, a user may be able to define what types of classes are to be normalized (including classes native to the CMDB or user-created classes), as well as which attributes of those classes are to be normalized. In some embodiments, the normalization configuration will not be data provider specific because there can be contradictions between different data provider configurations. Other embodiments for the Normalization Engine infrastructure design, such as using an independent server for the Normalization Engine, are also possible in accordance with the present teachings.

As mentioned previously, the architecture of the NE could be fully extensible, allowing for rules-based plug-ins to be authored by third party providers as well as users of the CMDB. An SDK or suitable UI could be provided giving users of the CMDB and NE the tools available to specify both the logic and the Knowledge Bases to be used, thus allowing them to extend the NE and normalize whatever CIs, groups of CIs, relationships, and/or specific classes and attributes they so desire according to whatever rule(s) they so desire.

Figure 7:
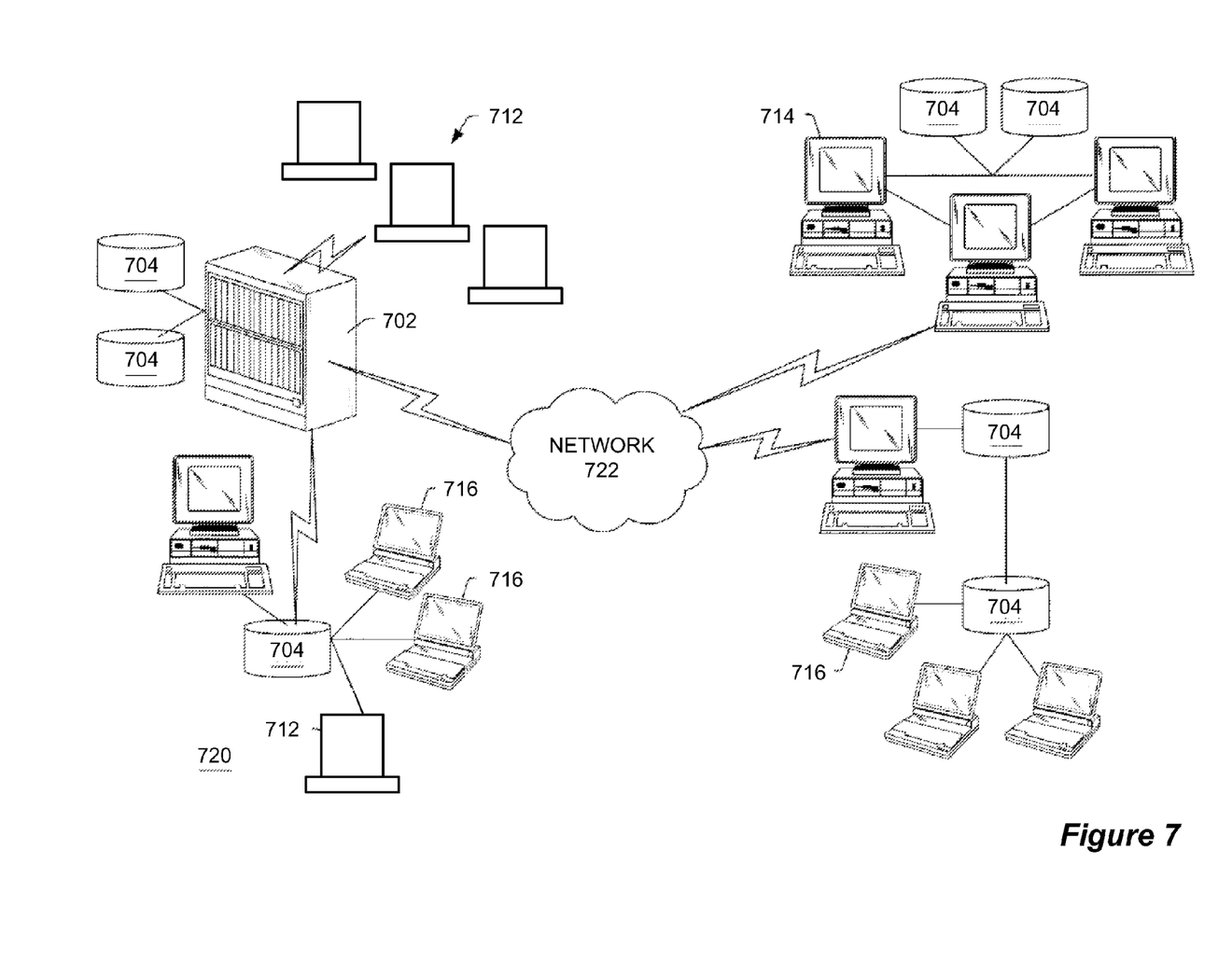
FIG. 7 shows an exemplary enterprise computing environment.

FIG. 7 illustrates an exemplary enterprise computing environment wherein one embodiment of the present invention may be installed. The CMDB 100 may be installed and running on any one or more of the computing endpoints in communication with the network shown in FIG. 7. As shown, the enterprise computing environment may include one or more computers, for example, mainframe computer 702, which may include one or more storage devices, e.g., file servers 704, also referred to as direct access storage devices (DASD). A plurality of computer systems or terminals 712 may be coupled to the mainframe computer 702, wherein the computer systems or terminals 712 access data stored in the storage devices, e.g., file servers 704, coupled to or part of the mainframe computer 702.

The mainframe computer system 702 may be coupled to one or more other computer systems and/or computer networks, including other mainframe computer systems. The mainframe computer system 702 may be coupled locally to a computer system network 720 in a local area network (LAN) configuration, or may be coupled to one or more computer systems and/or networks through a wide area network (WAN) 722. As shown in FIG. 7, the mainframe computer system 702 may be directly coupled to a local area network 720, such as a PC-based or client/server based network. The LAN 720 may comprise a storage device, e.g., file server 704, coupled to one or more desktop computer systems 714, one or more portable computer systems 716 and possibly one or more computer systems or terminals 712. As also shown in FIG. 7, the mainframe computer 702 may also be coupled through a wide area network 722, to one or more additional local area networks 720, such as PC-based networks as shown. Each of the PC based networks may comprise one or more storage devices, e.g., file servers 704 and one or more of either desktop computer systems 714 or portable computer systems 716. The wide area network 722 may be any of various types, such as the Internet.

Each of the one or more mainframe computer systems 702, the computer systems 714 and 716, as well as storage devices, e.g., file servers 704 may include various components as is standard in computer systems. For example, the mainframe computer system 702 may include one or more processors or CPUs, preferably multiple CPUs, as well as non-volatile memory, such as is represented by elements 704, and various internal buses, etc., as is well known in the art, as well as a display device. In a similar manner, each of the desktop computer systems 714 and/or portable computer systems 716, or other computer systems included within the enterprise, comprise various standard computer components including one or more CPUs, one or more buses, memory, a power supply, non-volatile memory, and a display, such as a video Monitor or LCD display. The computer systems or terminals 712 may comprise standard "dumb" terminals as used with mainframes, i.e., may comprise a display and video hardware and/or memory for displaying data on the display provided from the mainframe computer system 702.

The mainframe computer system 702 may store a database comprising data which is desired to be accessible among a portion or all of the enterprise, e.g., is desired to be accessible by one or more of the computer systems 714 and 716. The database stored in the mainframe computer system 702 may be distributed among one or more of the various storage devices, e.g., file servers 704 connected to the various computer systems 714 and 716. Thus, it is desired that the data comprising the database be distributed among the enterprise for ready access among multiple users. It is also possible that multiple different database management systems are used within the enterprise, e.g., one or more of the file servers 704 may store its own database which is desired to be replicated among various of the other file servers and/or the mainframe computer system 702.

One or more of the computer systems 702, 712, 714, and 716 preferably include a memory medium on which computer programs according to the invention may be stored. In addition, the memory medium may be located in a first computer in which the programs are executed, or may be located in a second different computer which connects to the first computer over a network (e.g., LAN 720 or WAN 722). In the latter instance, the second computer provides the program instructions to the first computer for execution. Also, the computer systems 702/704, 712, 714, and 716 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software utility program or programs for graphically displaying database record organization characteristics as described herein. The software program(s) may be implemented in any of various ways, including procedure-based techniques, component-based techniques, and/or object-oriented techniques, among others. For example, the software program may be implemented using ActiveX® controls, C++ objects, Java® objects, Microsoft Foundation Classes (MFC), or other technologies or methodologies, as desired. (ACTIVEX is a registered trademark of the Microsoft Corporation. JAVA is a registered trademark of Sun Microsystems, Inc.) A computer system executing code and data from a memory medium comprises a means for graphically displaying database record organization according to the methods and/or block diagrams described below.

Various embodiments further include receiving or storing instructions and/or data implemented in accordance with the foregoing description upon a memory medium. Suitable memory media include a memory medium as described below.

Figure 8:
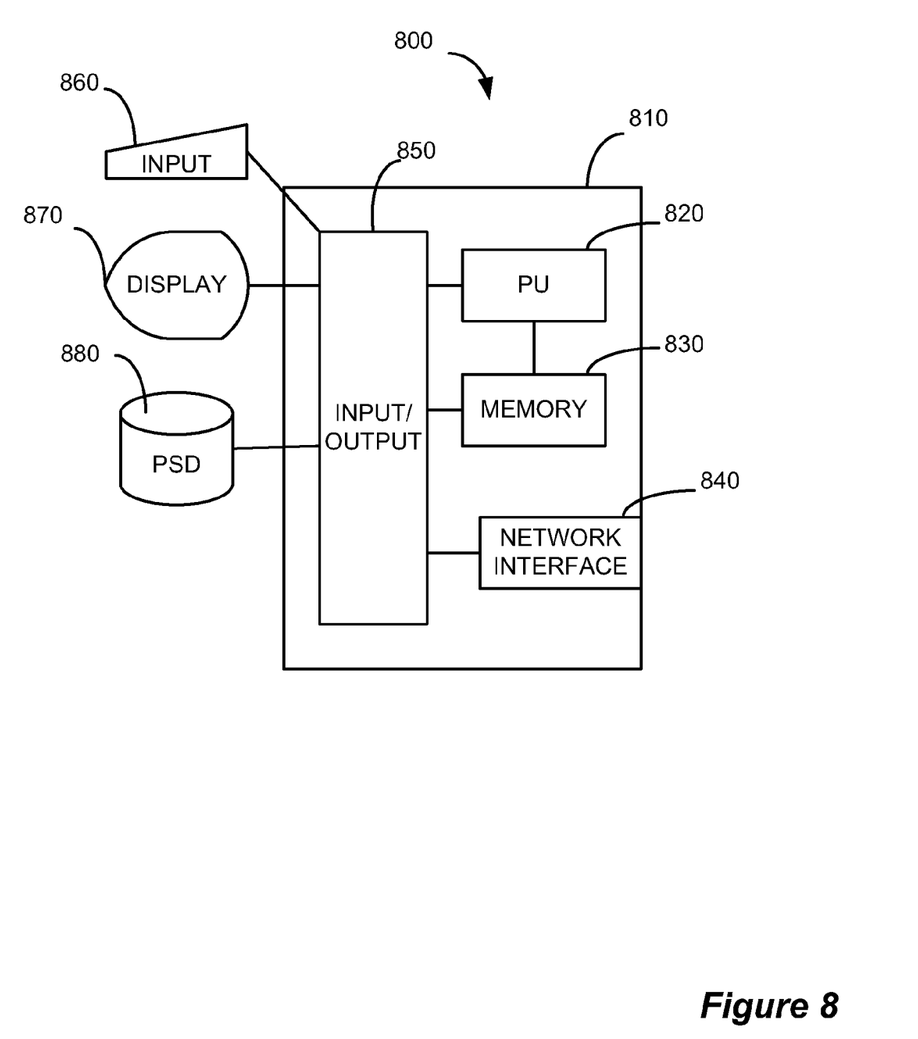
FIG. 8 shows, in block diagram form, an exemplary computer system comprising a program control device.

Referring now to FIG. 8, an exemplary computer system 800 is shown. One or more exemplary computer systems 800 may be included in a mainframe computer (e.g., Element 702 in FIG. 7). Exemplary computer system 800 may comprise a programmable control device 810 which may be optionally connected to input 860 (e.g., a keyboard, mouse, touch screen, etc.), display 870 or program storage device (PSD) 880 (sometimes referred to as direct access storage device or DASD). Also, included with program device 810 is a network interface 840 for communication via a network with other computing and corporate infrastructure devices (See FIG. 7). Note that network interface 840 may be included within programmable control device 810 or be external to programmable control device 810. In either case, programmable control device 810 will be communicatively coupled to network interface 840. Also note that program storage unit 880 represents any form of non-volatile storage including, but not limited to, all forms of optical and magnetic storage elements including solid-state storage.

Program control device 810 may be included in a computer system and be programmed to perform methods in accordance with this disclosure. Program control device 810 comprises a processor unit (PU) 820, input-output (I/O) interface 850 and memory 830. Processing unit 820 may include any programmable controller device including, for example, processors of an IBM mainframe (such as a quad-core z10 mainframe microprocessor). Alternatively, in non mainframe systems, examples of processing unit 820 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 830 may include one or more memory modules and comprise random access memory (RAM), read only memory (ROM), programmable read only memory (PROM), programmable read-write memory, and solid state memory. One of ordinary skill in the art will also recognize that PU 820 may also include some internal memory including, for example, cache memory.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 5A-5B may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 5-6 may be performed by an exemplary computer system 800 comprising a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium" or "computer useable medium," that are suitable for tangibly embodying program instructions may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. However, those of ordinary skill in the art will recognize that information may also be maintained as structured text, binary object data (e.g., binary data structures), HTML, XML, or other forms of storing data.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system including instructions tangibly embodied on a non-transitory computer useable medium, and executable by at least one processor, the system comprising:
    one or more knowledge bases configured to store one or more normalization rules; and
    a normalization engine in communication with the knowledge bases and configured to cause the at least one processor to:
        select one or more Configuration Items (CIs) from one or more external data providers to be automatically normalized including identifying one or more duplicate CIs from the one or more external data providers through a discovery process;
        after selecting the one or more CIs to be automatically normalized, select one or more normalization rules from the one or more knowledge bases;
        after selecting the one or more normalization rules from the one or more knowledge bases, apply the one or more selected normalization rules to the one or more selected CIs to determine if there are any inconsistencies between the one or more selected CIs and the one or more selected normalization rules; and
        for at least one of the one or more selected CIs, when there is an inconsistency determined between the one or more selected CIs and the one or more selected normalization rules, automatically normalize incoming data related to the one or more selected CIs from the one or more external data providers by taking an appropriate remedial action including cleaning the incoming data to remove the inconsistency and reconcile the one or more duplicate CIs before storing the at least one of the one or more selected CIs in a data repository.

2. The computer system of claim 1, wherein the normalization engine is configured to perform data normalization before the one or more CIs have been stored in a configuration management database.

3. The computer system of claim 1, wherein the normalization engine is configured to perform data normalization after the one or more CIs have been stored in a configuration management database.

4. The computer system of claim 1, wherein the normalization engine is further configured to cause the at least one processor to perform data normalization at specified intervals.

5. The computer system of claim 1, wherein the normalization engine is configured to use rules-based plug-ins.

6. The computer system of claim 1, wherein the one or more CIs comprise a plurality of related CIs.

7. The computer system of claim 1, wherein the one or more CIs comprise one or more relationship CIs.

8. The computer system of claim 1, wherein taking an appropriate remedial action comprises:
    updating at least one of the one or more selected CIs according to the one or more selected normalization rules so as to remove at least one inconsistency between the one or more selected CIs and the one or more selected normalization rules to thereby reconcile the duplicate CIs.

9. The computer system of claim 1, wherein the programmed act of taking an appropriate remedial action comprises:
    creating a report of at least one inconsistency between the one or more selected CIs and the one or more selected normalization rules.

10. The computer system of claim 1, wherein the programmed act of taking an appropriate remedial action comprises:
    warning a user of at least one inconsistency between the one or more selected CIs and the one or more selected normalization rules.

11. The computer system of claim 1, wherein the one or more knowledge bases comprise one or more of the following: a Product Catalog, an Alias Catalog, a Rules Catalog, and a Relationship Catalog.

12. A computer system including instructions tangibly embodied on a non-transitory computer useable medium, and executable by at least one processor, the system comprising:
    a first data store; and
    a normalization engine in communication with the first data store and configured to cause the at least one processor to:
        define selection criteria for automatic data normalization, wherein the defined selection criteria comprise:
            the selection of one or more classes of Configuration Items (CIs) including duplicate CIs;
            the selection of one or more attributes from each of the one or more selected classes of CIs including the duplicate CIs; and
            the selection of one or more normalization rules from one or more knowledge bases;
        select one or more CIs that meet the defined selection criteria from one or more external data providers through a discovery process including applying the one or more selected normalization rules to the one or more selected CIs to determine if there are any inconsistencies between the one or more selected CIs and the one or more selected normalization rules; and
        before storing at least one of the one or more selected CIs that meet the defined selection criteria in the first data store:
            compare a value for at least one of the one or more selected attributes to a corresponding specified attribute value stored in the first data store; and
            automatically normalize incoming data related to the one or more selected CIs from the one or more external data providers by cleaning the incoming data related to the selected CIs including the duplicate CIs by replacing the value of each compared attribute with the corresponding specified attribute value if the value of the compared attribute does not equal the corresponding specified attribute value to thereby remove inconsistencies of the incoming data and reconcile the duplicate CIs.

13. The computer system of claim 12, wherein the normalization engine is configured to data normalization in response to a creation or modification of a CI.

14. The computer system of claim 12, wherein the normalization engine is configured to cause the at least one processor to perform data normalization at specified intervals.

15. The computer system of claim 12, wherein the first data store comprises a product catalog.

16. The computer system of claim 12 further comprising:
a second data store, wherein the normalization engine is in communication with the second data store and is further configured to cause the at least one processor to:
compare a name value for at least one of the one or more CIs that meet the defined selection criteria to values stored in the second data store; and
for each of the one or more CIs whose name value matches a value stored in the second data store, replace the name value of the CI with a corresponding preferred name value stored in the second data store,
wherein comparing and replacing values in the second data store are programmed to occur before comparing and replacing values in the first data store.

17. The computer system of claim 16, wherein the second data store comprises an alias catalog.

18. The computer system of claim 12, wherein the selected attributes comprise one or more of the following: product categorization; manufacturer name; product name; version number; access control information; and patch number.

19. The computer system of claim 12, wherein the normalization engine is configured to use rules-based plug-ins.

20. A program storage device, readable by a programmable control device, comprising instructions stored on the program storage device for causing the programmable control device to:
select one or more Configuration Items (CIs) from one or more external data providers to be automatically normalized by including identifying one or more duplicate CIs from the one or more external data providers through a discovery process;
after selecting the one or more CIs to be automatically normalized, select one or more normalization rules from one or more knowledge bases;
after selecting the one or more normalization rules from the one or more knowledge bases, apply the one or more selected normalization rules to the one or more selected CIs to determine if there are any inconsistencies between the one or more selected CIs and the one or more selected normalization rules; and
for at least one of the one or more selected CIs, when there is an inconsistency determined between the one or more selected CIs and the one or more selected normalization rules, automatically normalize incoming data related to the one or more selected CIs from the one or more external data providers by taking take an appropriate remedial action including cleaning the incoming data to remove the inconsistency and reconcile the one or more duplicate CIs before storing the at least one of the one or more selected CIs in a data repository.

21. The program storage device of claim 20, wherein the instructions comprising the normalization rules are extensible via the use of rules-based plug-ins.

22. The program storage device of claim 20, wherein the one or more CIs comprise a plurality of related CIs.

23. The program storage device of claim 20, wherein the one or more CIs comprise one or more relationship CIs.

24. The program storage device of claim 20, wherein the instructions to take an appropriate remedial action comprise instructions to:
update at least one of the one or more selected CIs according to the one or more selected normalization rules so as to remove at least one inconsistency between the one or more selected CIs and the one or more selected normalization rules to thereby reconcile the duplicate CIs.

25. The program storage device of claim 20, wherein the instructions to take an appropriate remedial action comprise instructions to:
create a report of at least one inconsistency between the one or more selected CIs and the one or more selected normalization rules.

26. The program storage device of claim 20, wherein the instructions to take an appropriate remedial action comprise instructions to:
warn a user of at least one inconsistency between the one or more selected CIs and the one or more selected normalization rules.

27. A computer-implemented data normalization method, the method comprising:
selecting one or more Configuration Items (CIs) from one or more external data providers to be automatically normalized by including identifying one or more duplicate CIs from the one or more external data providers through a discovery process;
after selecting the one or more CIs to be automatically normalized, selecting one or more normalization rules from one or more knowledge bases;
after selecting the one or more normalization rules from the one or more knowledge bases, applying the one or more selected normalization rules to the one or more selected CIs to determine if there are any inconsistencies between the one or more selected CIs and the one or more selected normalization rules; and
for at least one of the one or more selected CIs, when there is an inconsistency determined between the one or more selected CIs and the one or more selected normalization rules, automatically normalizing incoming data related to the one or more selected CIs from the one or more external data providers by taking take an appropriate remedial action including cleaning the incoming data to remove the inconsistency and reconciling the one or more duplicate CIs before storing the at least one of the one or more selected CIs in a data repository.

28. The method of claim 27, wherein the act of data normalization occurs before the one or more CIs have been stored in the CMDB.

29. The method of claim 27, wherein the act of data normalization occurs after the one or more CIs have been stored in the CMDB.

30. The method of claim 27, wherein the act of data normalization is configured to occur at specified intervals.

31. The method of claim 27, wherein the act of data normalization is extensible via the use of rules-based plug-ins.

32. The method of claim 27, wherein the one or more CIs comprise a plurality of related CIs.

33. The method of claim 27, wherein the one or more CIs comprise one or more relationship CIs.

34. The method of claim 27, wherein the act of taking an appropriate remedial action comprises:
updating at least one of the one or more selected CIs according to the one or more selected normalization rules so as to remove at least one inconsistency between the one or more selected CIs and the one or more selected normalization rules to thereby reconcile the duplicate CIs.

35. The method of claim 27, wherein the act of taking an appropriate remedial action comprises:
creating a report of at least one inconsistency between the one or more selected CIs and the one or more selected normalization rules.

36. The method of claim 27, wherein the act of taking an appropriate remedial action comprises:
warning a user of at least one inconsistency between the one or more selected CIs and the one or more selected normalization rules.

37. The method of claim 27, wherein the one or more knowledge bases comprise one or more of the following: a Product Catalog, an Alias Catalog, a Rules Catalog, and a Relationship Catalog.

38. A computer network executing the computer-implemented data normalization method of claim 27, the computer network comprising:
one or more non-volatile storage devices for maintaining configuration management information; and
one or more computer systems communicatively coupled to the network, at least one of the one or more computer systems programmed to perform at least a portion of the method of claim 27,
wherein the entire method of claim 27 is performed collectively by the one or more computer systems communicatively coupled to the network.

39. The computer network of claim 38, further comprising:
one or more knowledge bases that contain information relating to preferred attribute values, configurations, or rules.

40. The computer network of claim 38, further comprising a normalization engine, wherein the normalization engine is configured to initiate the data normalization method.

41. The computer network of claim 38, wherein the data normalization method is configured to be executed in response to a creation or modification of a CI.

42. The computer network of claim 38, wherein the data normalization method is configured to be executed at specified intervals.

43. The computer network of claim 38, wherein the data normalization method is extensible via the use of rules-based plug-ins.

* * * * *

UNITED STATES PATENT AND TRADEMARK OFFICE
CERTIFICATE OF CORRECTION

PATENT NO.        : 8,554,750 B2
APPLICATION NO.   : 12/685096
DATED             : October 8, 2013
INVENTOR(S)       : Govindarajan Rangarajan et al.

It is certified that error appears in the above-identified patent and that said Letters Patent is hereby corrected as shown below:

In the Claims:

In column 13, line 51, In Claim 20, after "taking" delete "take".

In column 14, line 39, In Claim 27, after "taking" delete "take".

In column 16, line 14, In Claim 41, delete "Cl" and insert -- CI --, therefor.

Signed and Sealed this
Eleventh Day of March, 2014

Michelle K. Lee
*Deputy Director of the United States Patent and Trademark Office*